United States Patent [19]

Hauk

[11] Patent Number: 4,673,432
[45] Date of Patent: Jun. 16, 1987

[54] PROCESS FOR THE PRODUCTION OF PIG IRON

[75] Inventor: Rolf Hauk, Düsseldorf, Fed. Rep. of Germany

[73] Assignees: Korf Engineering GmbH, Dusseldorf, Fed. Rep. of Germany; Voest-Alpine Aktiengesellschaft, Linz, Austria

[21] Appl. No.: 819,404

[22] Filed: Jan. 16, 1986

[30] Foreign Application Priority Data

Jan. 31, 1985 [DE] Fed. Rep. of Germany ....... 3503493

[51] Int. Cl.$^4$ .............................................. C21B 13/14
[52] U.S. Cl. .......................................... 75/38; 75/40; 266/160
[58] Field of Search ....................... 75/38, 40; 266/160

[56] References Cited

U.S. PATENT DOCUMENTS

| | | | |
|---|---|---|---|
| 2,865,734 | 12/1958 | Klemantaski | 75/40 |
| 4,306,903 | 12/1981 | Beggs et al. | 75/40 |
| 4,504,043 | 3/1985 | Yamaoka et al. | 75/38 |

Primary Examiner—Melvyn J. Andrews

[57] ABSTRACT

A process for the production of pig iron from iron ore is disclosed. The pig iron is firstly converted to sponge iron in a direct reduction shaft furnace (1) and then the sponge iron is converted to pig iron in a melt-down gasifier (2). The shaft furnace and melt-down gasifier are interconnected by means of downcomers (6). Apart from the sponge iron, the melt-down gasifier is supplied with a carbon carrier in the form of coke and oxygen-containing gas. The gas produced in the melt-down gasifier is supplied to the shaft furnace (1) in the form of reduction gas via downcomers (6), pipe (8), cyclone separator (12) and pipe (4). By means of pipes (10 and 11), cooled, cleaned blast furnace gas from shaft furnace (1) is admixed as cooling gas with the gas produced in the melt-down gasifier. With the aid of a screen (15), the melt-down gasifier is supplied with the fine fraction via pipe (7) and the shaft furnace is supplied via pipe (16) with the coarse fraction of the coke required for the operation of the plant. The coke introduced into the shaft furnace passes through the same and then enters the melt-down gasifier in preheated, dried form. The coke in the shaft furnace also leads to a reduction of $CO_2$ and $H_2O$ to $CO$ and $H_2$ and also reduces the sticking tendency of the sponge iron.

8 Claims, 1 Drawing Figure

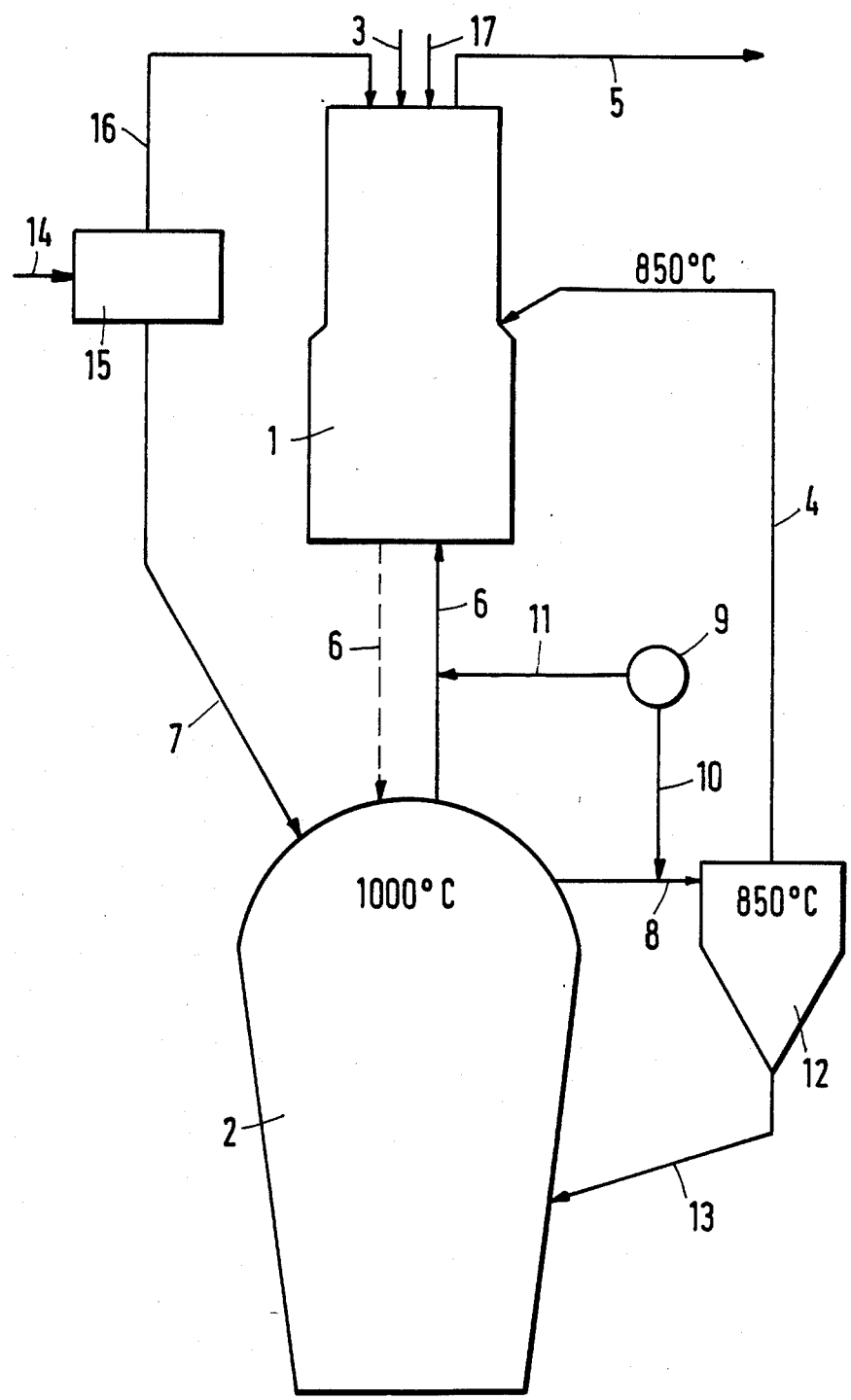

PROCESS FOR THE PRODUCTION OF PIG IRON

The invention relates to a process for the production of pig iron from iron ore, which is initially reduced to sponge iron in a direct reduction shaft furnace by means of a hot reduction gas and the sponge iron obtained is melted in a melt-down gasifier, accompanied by the supply of a carbon carrier and an oxgen-containing gas and accompanied by the formation of at least part of the reduction gas.

Such a process is known from German patent 30 34 539. In the latter, the heat necessary for melting the sponge iron and the reduction gas are produced in said prior art in the melt-down gasifier from the coal directly introduced thereinto and the blown-in oxygen-containing gas. Then a first partial gas flow, following cooling and dust removal is blown into the reduction zone of the shaft furnace. However, this process suffers from the disadvantage that the moist, cold coal introduced leads to cooling in the vicinity of the inlets provided for the same, i.e. in the gasifier head, so that there is an undesirably high content of $CO_2$ and $H_2O$ in the reduction gas. This naturally reduces the degree of reduction of the sponge iron obtained in the shaft furnace. Coke normally has a moisture content of approximately 10%. High temperature carbonized coke made of brown coal (lignite) must be brought to a moisture content of this magnitude prior to transportation and drying is not possible prior to introduction into the melt-down gasifier due to the fire risk. Thus, through the direct introduction of the carbon carrier into the melt-down gasifier, its thermal balance is significantly impaired.

In the known process, a large amount of reduction gas is required to bring about a good metallization of the sponge iron, because the reduction gas consumed in the reduction shaft is not regenerated.

The metallization of the sponge iron produced in the shaft furnace is also dependent on the reduction gas temperature. The higher this temperature, the greater the iron ore reduction speed and the more unburnt slag-making flux can be supplied to the shaft. However, in the known process, it is not possible to set the reduction gas temperature randomly high, because otherwise there would be a risk of fusing and caking of the sponge iron particles. This would greatly prejudice the transfer of the sponge iron in and particularly its discharge from the shaft furnace.

The problem of the present invention is therefore to so develop a process of the aforementioned type that the thermal balance of the melt-down gasifier is improved and which acts on the shaft in such a way that the quantity of CO and $H_2$-containing gas and consequently the reduction gas quantity can be reduced. In addition, a caking of the iron ore and/or sponge iron particles is to be prevented.

According to the invention this problem is solved in that a carbon carrier is also supplied to the iron ore fed into the direct reduction shaft furnace.

According to an advantageous development of this process, the carbon carrier supplied to the iron ore comprises coke, preferably high temperature carbonized coke and its fine fraction is fed to the melt-down gasifier. The ratio of the carbon carrier quantity added to the iron ore to the total carbon carrier quantity used is 5 to 60 and preferably 10 to 30%. Part of the direct reduction shaft furnace flue gas is advantageously supplied to the gas produced in the melt-down gasifier for the cooling thereof, said gas being more particularly supplied to the direct reduction shaft furnace in the bustle plane and in the bottom region and the direct reduction shaft furnace flue gas is admixed with the melt-down gasifier gas supplied in the bustle plane and in the bottom region in different quantity ratios for setting different temperatures. It is finally possible to add unburnt fluxes and/or burnt fluxes to the iron ore in the direct reduction shaft furnace for the preheating and/or drying thereof.

The invention is described in greater detail hereinafter relative to an embodiment shown in the drawing, which is a diagrammatic representation of a plant for producing pig iron from iron ore.

The plant shown essentially comprises a direct reduction shaft furnace 1 and a melt-down gasifier 2 positioned below it. Preferably lumpy iron ore is supplied to shaft furnace 1 by a pipe 3 in per se known manner. Reduction gas is blown into the shaft furnace 1 via a pipe 4 in the bustle plane, rises upwards counter to the flow of the downwardly migrating iron ore and brings about the reduction of the latter. After flowing through shaft furnace 1, said gas is removed as blast furnace gas via a pipe 5.

By means of downcomers 6, the iron ore reduced to sponge iron enters the melt-down gasifier 2. Reduction gas produced in the melt-down gasifier 2 is simultaneously passed via said downcomer 6 and corresponding openings in the bottom region of shaft furnace 1 into the latter, where it can e.g. be used for the cooling or carburization of the sponge iron. Apart from the sponge iron which is supplied to the melt-down gasifier 2 via a pipe 7, a carbon carrier is supplied thereto in the form of high temperature carbonized coke, as well as an oxygen-containing gas via a not shown pipe. The reduction gas produced in melt-down gasifier 2 and essentially comprising CO and $H_2$ and which has a temperature of approximately 1000° C. is cooled to a temperature of approximately 850° C. in a pipe 8 by the admixing of cooling gas. The latter is obtained from a source 9 and is conveyed via a pipe 10 to pipe 8. Source 9 is also connected via a pipe 11 to downcomer 6, so that here again the reduction gas rising through downcomer 6 from melt-down gasifier 2 can be cooled to a desired temperature. After corresponding cooling and cleaning, source 9 is supplied with the blast furnace gas from shaft furnace 1 removed by pipe 5. The cooled reduction gas passes via pipe 8 into a cyclone separator 12, where its dust particles 13 are removed, which are returned to the melt-down gasifier 2 by a pipe 13. The cleaned reduction gas having the desired temperature of approximately 850° C. is passed via pipe 4 into shaft furnace 1.

The high temperature carbonized coke is initially conveyed via a pipe 14 to a screen 15, where the coke is subdivided in such a way that via pipe 7 its fine fraction is fed into the melt-down gasifier 2 and via a pipe 16 its coarse fraction is fed into the top of shaft furnace 1.

Separation takes place in such a way that the coarse fraction has a screen size of approximately 10 to 50 mm and the proportion of the coarse fraction in the total coke quantity is 5 to 60 and preferably 10 to 30%.

The coke supplied to shaft furnace 1 via pipe 16 is preheated and dried in the shaft furnace, so that only the coke portion fed into the melt-down gasifier 2 via pipe 7 is moist and cold. This makes it possible to considerably improve the thermal balance of the gasifier, so that the quality of the reduction gas produced in the melt-down gasifier is also improved. The coke introduced into shaft furnace 1 also has the effect that the $CO_2$ and $H_2O$ obtained from the reduction gas by reduction of the iron ore is partly converted back to CO and $H_2$. Thus, the result approaches the direct reduction taking place in the blast furnace, in which iron and carbon monoxide is formed from iron oxide and carbon. Thus, the reduction gas requirement is smaller and there is an overall carbon and oxygen saving effect.

The admixing of coke with the iron ore in the shaft furnace 1 leads to a reduced sticking tendency of the sponge iron. It is therefore possible to work at relatively high temperatures in shaft furnace 1, which leads to an improved degree of reduction.

A high degree of reduction is also achieved if the reduction gas blown over the bustle plane into shaft furnace 1 contains a relatively large amount of $CO_2$. This is partly converted into CO by the coke in the shaft furnace, so that it can participate in the iron ore reduction.

Through the increased reduction gas temperature and the possibility of converting $CO_2$ to CO through the coke in shaft furnace 1, it is still possible to introduce unburnt fluxes, such as limestone or dolomite into the shaft furnace, where they can be preheated and deacidified. For this purpose there is a pipe 17, which is connected to corresponding inlets in the upper region of shaft furnace 1.

I claim:

1. Process for producing pig iron from iron ore comprising steps of: providing a direct reduction shaft furnace and a separate melt-down gasifier;
    supplying lumpy iron ore to the direct reduction shaft furnace;
    supplying hot reduction gas to the direct reduction shaft furnace;
    reducing the iron ore to sponge iron in the direct reduction shaft furnace using the hot reduction gas in the direct reduction shaft furnace;
    supplying the sponge iron to the melt-down gasifier;
    melting the sponge iron in the melt-down gasifier;
    supplying a carbon carrier and an oxygen-containing gas to the melt-down gasifier;
    forming additional reduction gas in the melt-down gasifier;
    supplying the additional reduction gas from the melt-down gasifier to the direct reduction shaft furnace for use therein to reduce iron ore to sponge iron;
    dividing a high temperature carbonized coke into coarse particles and fine particles;
    supplying the fine particles of the carbonized coke as the carbonized carrier to the melt-down gasifier; and
    supplying the coarse particles of the high temperature carbonized coke to the direct reduction shaft furnace along with the iron ore being supplied thereto.

2. Process according to claim 1, characterized in that the carbon carrier is constituted by high temperature carbonized coke made of brown coal (lignite), whose coarse fraction is supplied to the direct reduction shaft furnace (1) and whose fine fraction is supplied to the melt-down gasifier (2).

3. Process according to claim 1, characterized in that the coke particles added to the iron ore has a screen size of 10 to 50 mm.

4. Process according to claim 1, characterized in that the ratio of the quantity of the carbon carrier added to the iron ore to the total carbon carrier quantity used is 5 to 60.

5. Process according to claim 1, characterized in that part of the flue gas of the direct reduction shaft furnace (1) is supplied to the gas produced in the melt-down gasifier (2) for the cooling thereof.

6. Process according to claim 5, characterized in that the gas produced in the melt-down gasifier (2) is supplied to the direct reduction shaft furnace (1) in the bustle plane and in the bottom region and that the flue gas of the direct reduction shaft furnace (1) is admixed with the gas of the melt-down gasifier (2) supplied in the bustle plane and the bottom region in different quantity ratios for setting different temperatures.

7. Process according to claim 1, characterized in that unburnt fluxes are added to the iron ore in the direct reduction shaft furnace (1).

8. Process according to claim 1, characterized in that burnt fluxes are added to the iron ore for the preheating and/or drying thereof.

* * * * *